Inventor:
Arthur Edouard
Clément Paris
By
Mauro, Cameron, Lewis & Massie,
Attorneys.

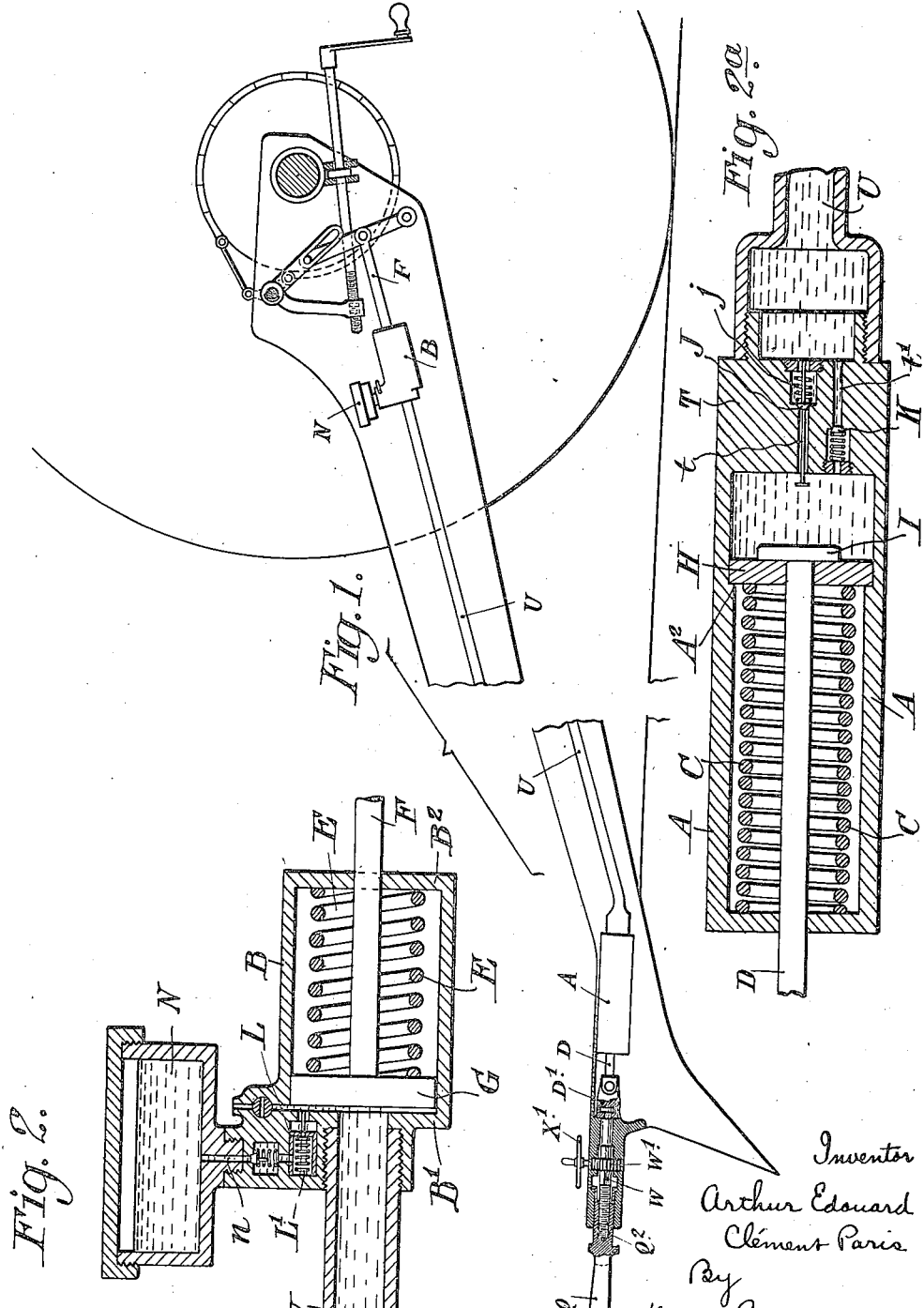

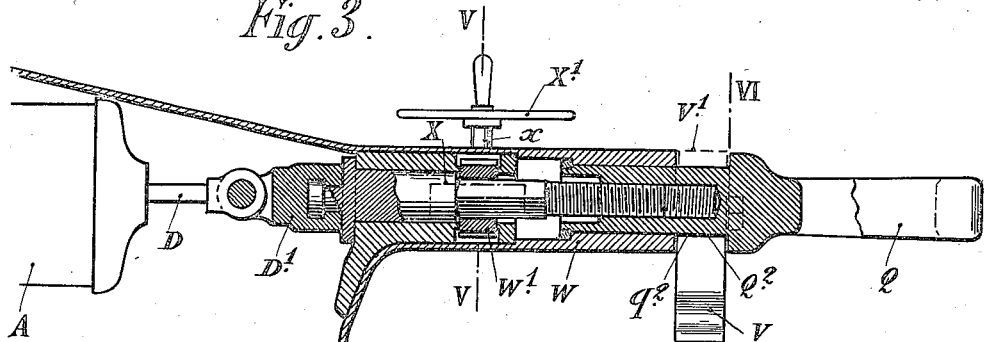
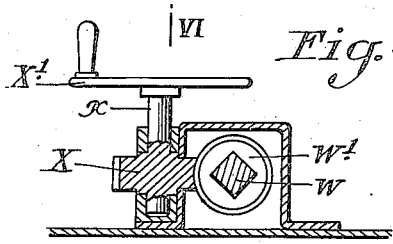
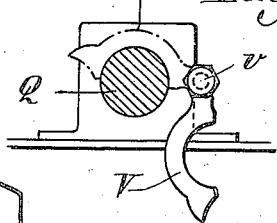
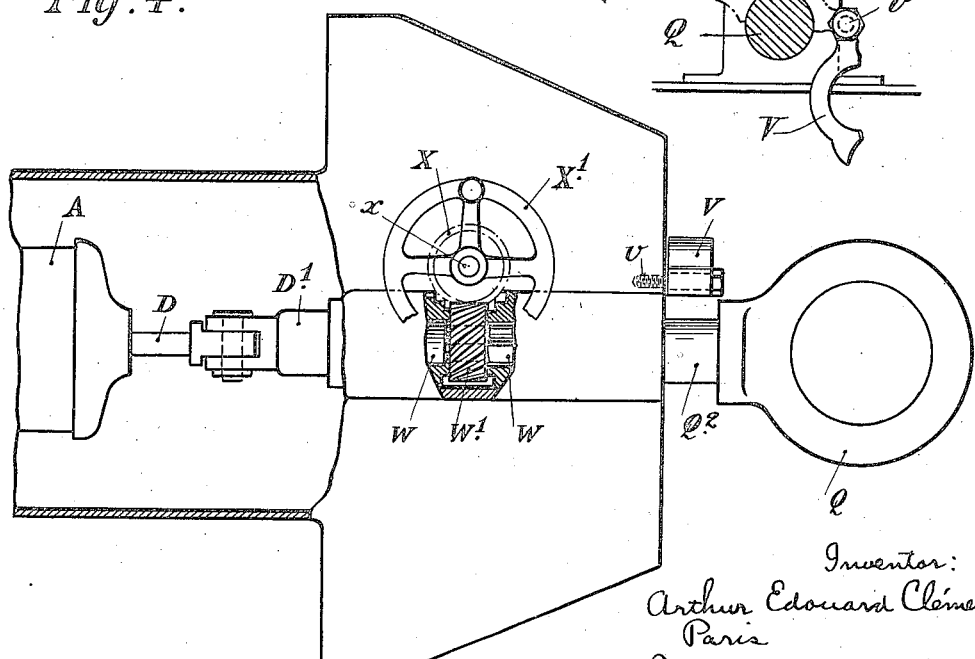

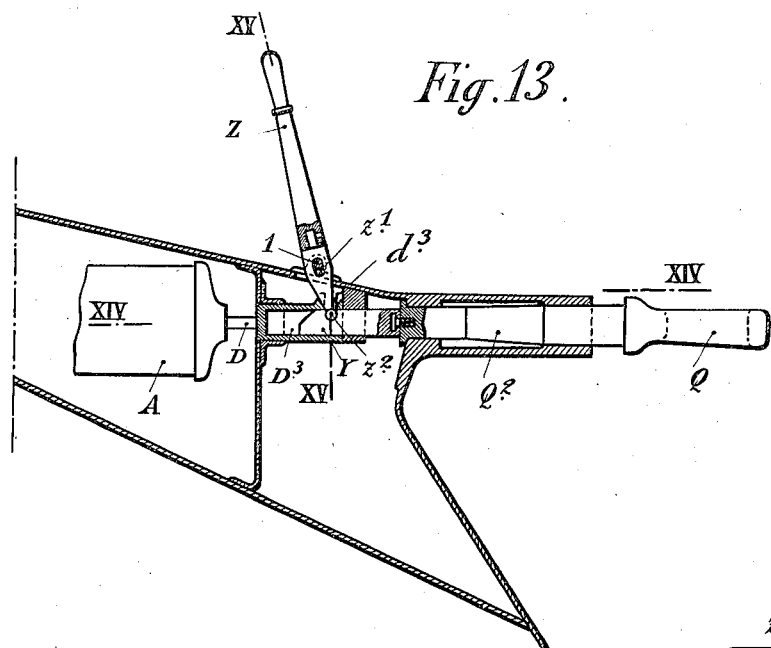
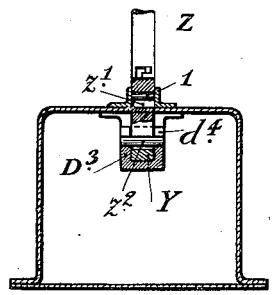
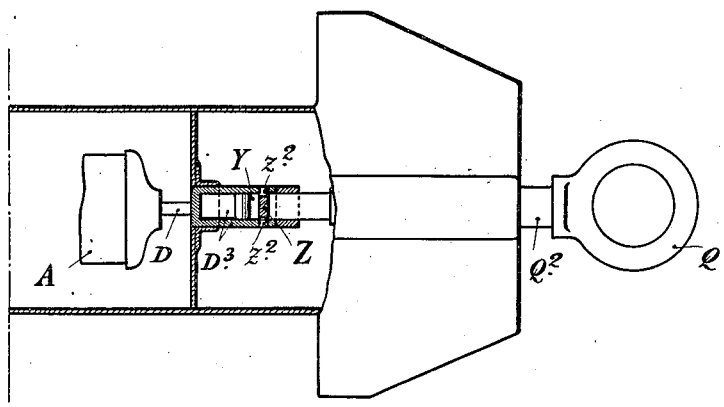

UNITED STATES PATENT OFFICE.

ARTHUR EDOUARD CLÉMENT PARIS, OF PUTEAUX, FRANCE.

AUTOMATIC TRACTOR-BRAKE.

1,315,570.          Specification of Letters Patent.     Patented Sept. 9, 1919.

Application filed February 14, 1918. Serial No. 217,262.

*To all whom it may concern:*

Be it known that I, ARTHUR EDOUARD CLÉMENT PARIS, a citizen of the French Republic, and a resident of No. 49 Rue Gambetta, Puteaux, Seine, France, have invented new and useful Improvements in Automatic Tractor-Brakes, which invention is fully set forth in the following specification.

This invention relates to automatic apparatus for braking the wheels of motor car trailers and the rear carriages of guns of the kind specified in the specification of my earlier application for Letters Patent Serial No. 193,214, filed Sept. 25, 1917, and it has for its object to provide various improved accessory devices for the said apparatus.

These improved devices are designed on the one hand to render the brake of the trailer inoperative when it is desired to cause the tractor with its trailer to execute as a whole a rearward movement through a certain distance. These devices are designed on the other hand to enable the brake of the trailer to be operated by hand if required; the option of operating by hand may be necessary when the tractor and the trailer are to be stopped as a whole on a gradient or in the case of a breakage of the coupling between the tractor and its trailer.

In accordance with this invention the bar connecting the coupling yoke (Q) to the rod (D) of the piston of the brake-operating apparatus as described in my aforesaid earlier specification, is split up into two elements with a coupling located between them; while a mechanism for actuating the element that is fixed to the rod of the piston, allows movement of the latter without moving as well the yoke which is in a fixed or uncoupled state at that moment.

Several constructional forms of these improved devices are illustrated in the accompanying drawings in which:

Figure 1 is a side elevation of the general arrangement of a wheel brake of the type specified in my aforesaid specification, applied to the wheeled axle of a gun carriage.

Figs. 2, 2ᵃ are longitudinal sectional views on a larger scale of the device for controlling the brake interposed between the latter and the yoke connecting the carriage to the tractor.

Fig. 3 is a vertical longitudinal section along the axis of the yoke connecting the brake-operating device and the tractor.

Fig. 4 is a plan corresponding to Fig. 3, the top part being broken away to show some of the underlying parts.

Figs. 5 and 6 are cross sections on the lines V—V and VI—VI respectively of Fig. 3.

The brake-operating apparatus is substantially identical with that specified in my said earlier specification. However, in the constructional form illustrated by Figs. 1 and 2, the cylinders A and B, instead of having a common end constituted by the separating partition T, are located away from each other. The rear head T of the cylinder A is in this arrangement connected to the front head $B^1$ of the cylinder B by means of a duct U filled with liquid. The valve J and its actuating spring $j$ and the non-return valve K are located in the head T of the cylinder A. The head $B^1$ of the cylinder B carries the reservoir N and serves for the lodgment of the valve L—$L^1$ which normally closes the communication between the said reservoir and the front end of the cylinder B into which latter the duct U opens freely.

The device for enabling the brake-operating apparatus to be rendered inoperative in case it is desired to move the gun carriage backward, is in this example simply a latch V pivoted on an axle pin $v$ to the trail of the gun carriage, and which in its turned over position (indicated in broken lines at $V^1$ in Fig. 6) engages between the shoulder of the yoke and the trail of the gun carriage in such a manner as to prevent any movement from the bar $Q^2$ which is fixed to the yoke. Normally, the said latch V occupies the position shown in full lines in Figs. 4 and 6.

The device for enabling the brake-operating apparatus to be actuated by hand, is constituted as follows:

The yoke bar between the yoke Q and the operating rod D of the piston H, comprises a spindle W the screw-threaded rear portion of which works in a corresponding internal screw-thread $q^2$ in the bar $Q^2$. The spindle W can rotate in a socket $D^1$ fixed to the piston rod D. The rotary motion of the rod W due to screwing and unscrewing the latter in the screw-thread $q^2$, thus produces a longitudinal movement of the rod D in one or the other direction. The rotation of the spindle W is produced for instance by arranging on it a spiral gear $W^1$ engaging with the teeth of a spiral gear X mounted on an axle $x$ rotatable in a bracket formed on the gun carriage trail, which axle can be operated by means of a hand wheel $X^1$.

When the rod D is to be operated by hand, the yoke Q is fixed either by the action of the tractor, or by the interposition of the latch V between it and the gun carriage trail.

Figs. 7 to 12 inclusive illustrate another constructional form of the improved devices for enabling the brake-operating apparatus to be rendered inoperative or to allow of actuating the said apparatus by hand.

Figure 7:
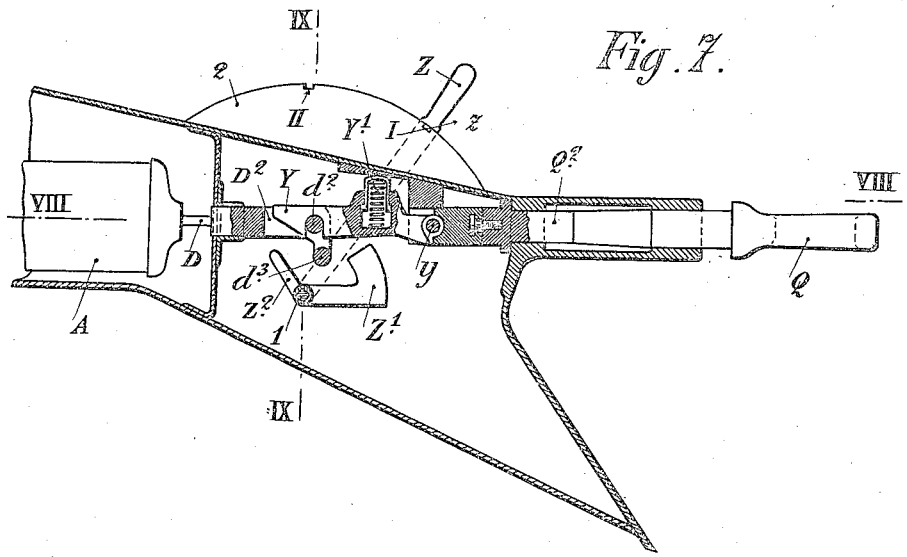

Fig. 7 is a vertical longitudinal section showing the parts and the apparatus in the normal position for allowing the brake-operating apparatus to operate automatically.

Figure 8:
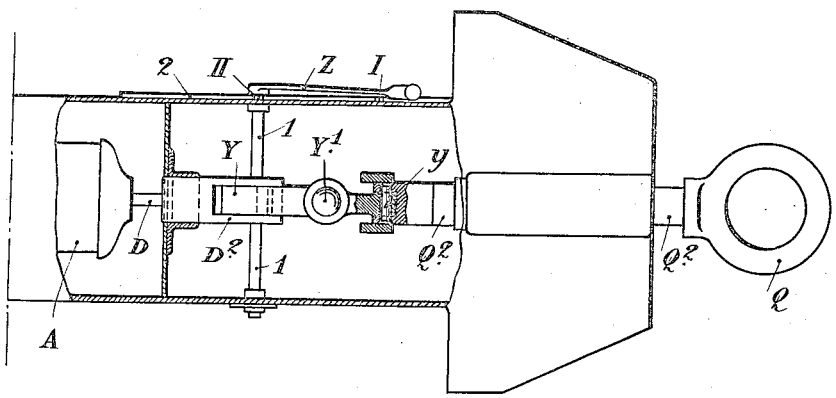

Fig. 8 is a horizontal section on the line VIII—VIII of Fig. 7.

Figure 9:
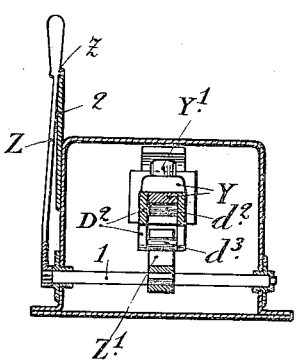

Fig. 9 is a vertical cross section on the line IX—IX of Fig. 7.

Figure 10:
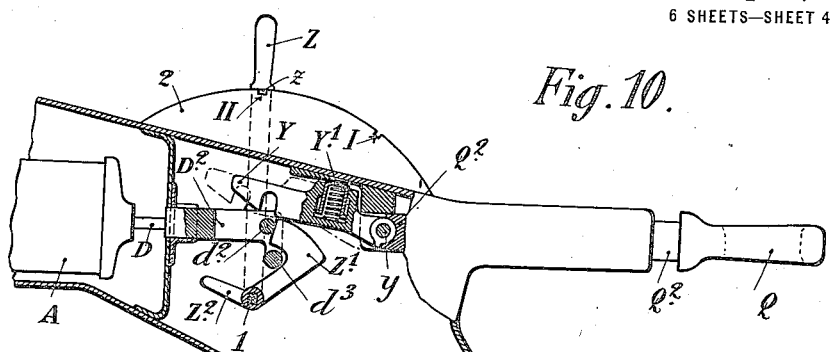
Figure 11:
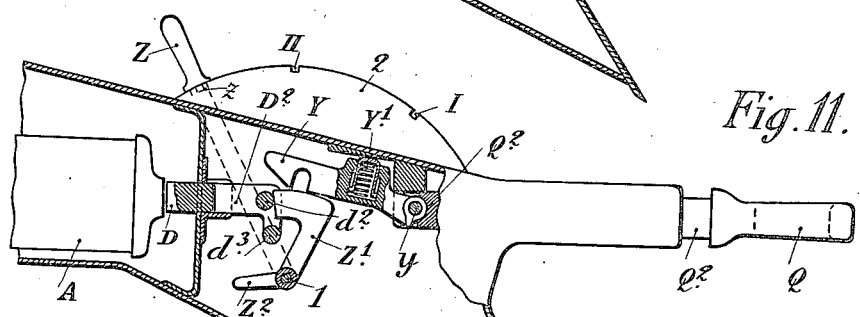
Figure 12:
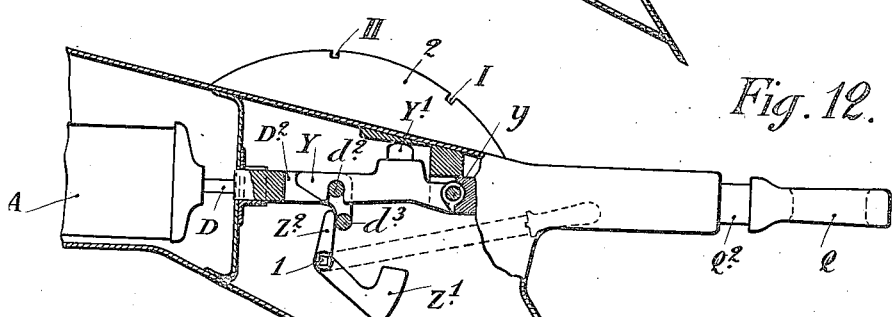

Figs. 10, 11 and 12 are vertical longitudinal sections similar to Fig. 7, showing the parts in different positions.

In this example a connection is provided between the bar $Q^2$ fixed to the yoke Q and the rod D of the piston H of the brake-operating apparatus. This coupling consists of a hook Y pivoted by means of an axle pin $y$ to the bar $Q^2$ and maintained normally engaged with an axle pin $d^2$ carried by a block $D^2$ fixed to the rod D. A spring $Y^1$ has a constant tendency to depress the hook Y and to maintain it in or return it into the position it occupies in Figs. 7, 8 and 9.

Z is a lever fixed on an axle 1 journaled in the sides of the gun carriage. On the handle of this lever Z is a spring stud $z$ which retains the lever swung in different positions by bringing said stud into notches I, II of a sector 2. The lever Z carries a finger with two limbs $Z^1$—$Z^2$. The limb $Z^1$ is arranged to lift the hook Y when the lever is moved from the position of engagement I into the position of engagement II, Fig. 10. When the hook has been so lifted, the coupling is opened between the rod D and the yoke Q and the automatic brake-operating apparatus is rendered inoperative.

When it is desired to actuate the brake-operating apparatus by hand, it is merely necessary to move the lever Z to the left beyond the position of engagement II. The nose of the finger $Z^1$ exerts in this movement a pressure upon the axle pin $d^2$ which has been released, while sliding underneath the hook Y and keeping the latter lifted as shown clearly in Fig. 11.

If in starting from one or the other of the positions shown in Figs. 10 and 11, it is desired to reëstablish the connection between the yoke Q and the rod D, it is merely necessary to move the lever back to the right. In this movement the finger $Z^1$ disengages from pin $d^2$, moves away from underneath the hook Y, and thereby permits the nose of this hook to drop into locking engagement with pin $d^2$. If the movement of the lever is continued toward the right beyond the engagement notch I, the finger $Z^2$, by exerting a pressure upon an axle pin $d^3$ carried by the block $D^2$, will move the latter toward the right, cause the axle pin $d^2$ to slide over the inclined nose of the hook Y, and bring the said axle pin $d^2$ into the notch of the said hook, as shown in Fig. 12. From this moment the lever Z can be returned into engagement with the engagement notch I.

Figs. 13 to 17 illustrate a modification of the devices described in the preceding example.

Fig. 13 is a vertical longitudinal section.

Fig. 14 is a horizontal section on line XIV—XIV of Fig. 13.

Fig. 15 is a vertical cross section on line XV—XV of Fig. 13.

Figure 16:
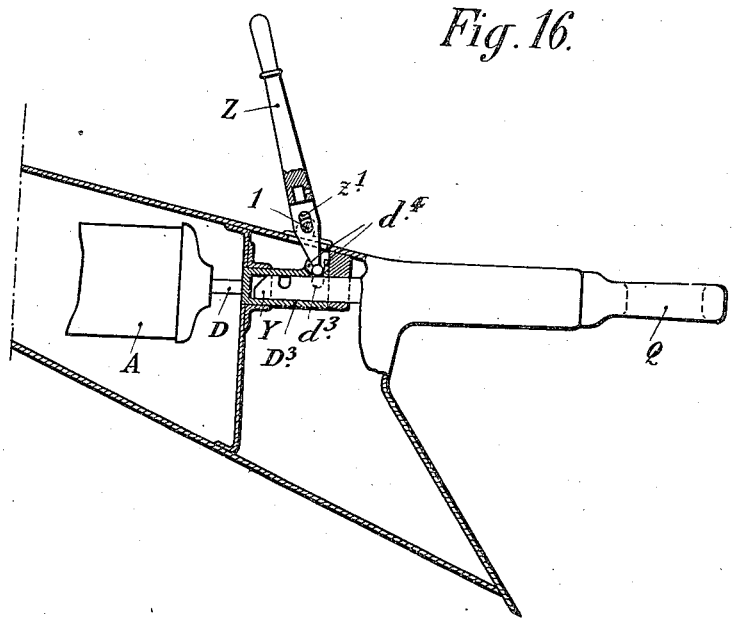
Figure 17:
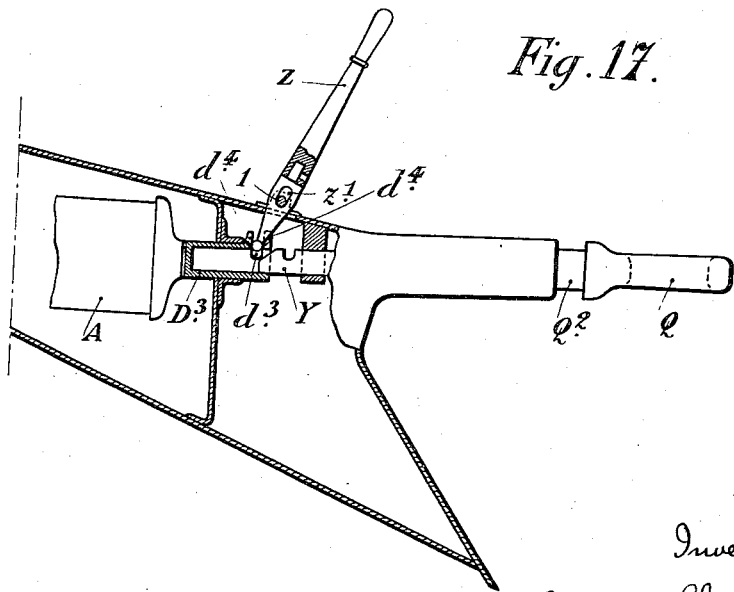

Figs. 16 and 17 are vertical longitudinal sections similar to Fig. 13, but showing the parts in two other positions.

As in the preceding example, a coupling is provided between the rod D and the yoke bar $Q^2$ fixed to the yoke Q. The coupling element carried by the rod D consists of a socket $D^3$ in which a hook Y is adapted to move that is rigidly fixed to the bar $Q^2$. A recess $d^{3a}$ of the socket $D^3$ is adapted to be engaged by the lower end of a lever $Z^a$ movable by means of a buttonhole shaped slot $z^1$ around an axle $1^a$ carried by the gun carriage trail. This slot $z^1$ is made of such size as to allow the lever Z to rotate, and also to rise slightly therein. The lower end of the lever carries an axle pin $z^2$ which normally (that is to say, when the parts are arranged for the automatic operation of the brake) is in engagement with the hook Y (Figs. 13, 14 and 15).

By simply raising the lever, the axle pin $z^2$ can be moved into the position shown in Fig. 16 whereby it is released from the hook Y and by that movement opens the coupling between the yoke bar $Q^2$ and the rod D.

The lever thus raised, remains however in engagement with the socket $D^3$ which is held by the axle pin $z^2$ in guides $d^4$ formed on the two sides of the aperture $d^3$ in the socket $D^3$. By this guidance of the lever in the socket, the movement of the said lever from left to right, starting from the position which it occupies in Fig. 16, will move the socket $D^3$ and thus cause the rod D to move in again (Fig. 17).

By a movement in the reverse direction, the socket $D^3$ is returned into the position shown in Fig. 16, and by a succeeding depressing of the lever Z, the connection between the axle pin $z^2$ and the hook Y is reestablished.

What I claim is:—

1. In brake apparatus for trailers and rear gun carriages wherein the operation of the brake mechanism is effected by movement of a normally restrained piston, the combination of an operating rod connected to said piston, a yoke-bar and means coupling said rod and bar, and manually-operated means acting through said coupling means to operate said rod independently of said yoke-bar.

2. In brake apparatus for trailers and rear gun carriages wherein the operation of the brake mechanism is effected by movement of a normally restrained piston, the combination of an operating rod connected to said piston, a yoke-bar and means coupling said rod and bar, manually operated means acting through said coupling to operate said rod independently of said yoke-bar, and means associated with said yoke-bar for rendering it ineffective to operate sa ton-operating rod when the trailer rearwardly.

3. In brake apparatus for trailers a gun carriages wherein the operation brake mechanism is effected by move a normally restrained piston, the co tion of an operating rod connected piston, a yoke-bar, means coupling s and bar comprising a spindle havin end a rotatable connection with said ing rod and at the opposite end a t connection with said yoke-bar, m operated means for rotating said and means for rendering said bar in to operate said piston-operating rc the trailer moves rearwardly.

In testimony whereof I have sig specification.

ARTHUR EDOUARD CLÉMENT

Witnesses:
HENRI MONIN,
CHAS. P. PRESSLY.